(12) United States Patent  
Surridge et al.

(10) Patent No.: US 7,845,152 B2  
(45) Date of Patent: Dec. 7, 2010

(54) GRASS CATCHER RETAINING DEVICE FOR REEL MOWER CUTTING UNIT

(75) Inventors: David G. Surridge, Raleigh, NC (US); Ronald L. Reichen, Raleigh, NC (US)

(73) Assignee: Deere & Company, Moline, IL (US)

(*) Notice: Subject to any disclaimer, the term of this patent is extended or adjusted under 35 U.S.C. 154(b) by 121 days.

(21) Appl. No.: 12/261,378

(22) Filed: Oct. 30, 2008

(65) Prior Publication Data

US 2010/0107586 A1    May 6, 2010

(51) Int. Cl.
 A01D 34/00   (2006.01)
 A01D 43/00   (2006.01)
 A01D 43/06   (2006.01)

(52) U.S. Cl. ........................................... 56/199

(58) Field of Classification Search ............... 56/199, 56/202, 203, 16.6, 320.2
See application file for complete search history.

(56) References Cited

U.S. PATENT DOCUMENTS

| | | | |
|---|---|---|---|
| 2,124,835 A | 7/1938 | Strutz | |
| 3,002,332 A | 10/1961 | Shane | |
| 3,110,147 A | 11/1963 | Barth | |
| 3,408,801 A | 11/1968 | Kroll | |
| 3,516,233 A * | 6/1970 | Johnson, Jr. et al. | 56/6 |
| 4,924,663 A | 5/1990 | Ehn, Jr. et al. | |
| 4,970,852 A | 11/1990 | Check et al. | |
| 5,228,277 A * | 7/1993 | Smith et al. | 56/16.9 |
| 5,412,931 A | 5/1995 | Reichen et al. | |
| 5,412,932 A * | 5/1995 | Schueler | 56/249 |
| 5,533,326 A | 7/1996 | Goman et al. | |
| 6,237,313 B1 | 5/2001 | Leden | |
| 6,341,478 B1 | 1/2002 | Sallstrom et al. | |
| 7,191,584 B2 * | 3/2007 | Goman et al. | 56/249 |
| 7,310,930 B2 | 12/2007 | Percy et al. | |
| 7,331,166 B2 * | 2/2008 | Phillips | 56/7 |
| 7,600,365 B2 * | 10/2009 | Hibi et al. | 56/199 |

FOREIGN PATENT DOCUMENTS

| EP | 1537769 | 6/2005 |
|---|---|---|
| EP | 2082640 | 7/2009 |

OTHER PUBLICATIONS

Wikipedia, the free encyclopedia. Carabiner. [online]. Retrieved from the Internet:<URL: http://en.wikipedia.org/wiki/Carabiner>.

* cited by examiner

*Primary Examiner*—Árpád Fábián-Kovács

(57) ABSTRACT

A grass catcher retaining device for a reel mower cutting unit includes a central support ring removably fastened to a loop projecting forwardly from a lift arm for the reel mower cutting unit. The central support ring may be pivotably mounted to the top of the grass catcher, and may have a gate that is spring biased to the closed position to engage a wireform loop extending forwardly from the lift arm that supports the reel mower cutting unit. Additionally, a rod may extend horizontally from the sides of a grass catcher and may be pivotably attached to the reel mower cutting unit.

12 Claims, 3 Drawing Sheets

GRASS CATCHER RETAINING DEVICE FOR REEL MOWER CUTTING UNIT

FIELD OF THE INVENTION

This invention relates generally to grass mowing equipment, and more specifically to a grass catcher retaining device for a reel mower cutting unit.

BACKGROUND OF THE INVENTION

In the past, various devices have been used to retain a grass catcher to a reel mower cutting unit. Typically, a grass catcher may be mounted directly in front of a reel mower cutting unit to collect grass clippings discharged from the cutting unit as it moves forward in the mowing position.

Grass mowing machines such as fairway mowers, trim mowers and triplex riding greensmowers may have reel mower cutting units that can pivot on one or more axes of rotation. For example, each reel mower cutting unit may be mounted to a lift arm extending from a traction unit so that the cutting unit can pitch on a horizontal axis parallel to the reel, roll on a horizontal axis in the direction of travel, and/or yaw or steer on a vertical axis. The pivoting action allows the cutting unit to better follow the ground surface, avoid scalping, and provide a more uniform height of cut.

While a reel mower cutting unit pivots, it is important that the grass catcher remain close enough to the cutting unit so that grass clippings do not fall into a gap between the cutting unit and grass catcher. To accomplish this, some grass catcher retaining devices have been designed to allow the grass catcher to pivot and move along with the reel mower cutting unit. Additionally, some grass catchers are mounted to a separate frame or to the grass mowing machine traction unit so that the reel mower cutting unit itself does not support the weight of the grass catcher.

For example, U.S. Pat. Nos. 5,533,326 and 6,341,478 relate to a triplex greensmower having a grass catcher mounted on a carrier frame in front of each reel mower cutting unit, with a pair of horns supporting the ends of the grass catcher. The '478 patent also relates to a pivot axis connection that is located forwardly and above the cutting unit so the grass catcher can yaw or steer.

Other grass mowing machines have retaining devices in which the reel mower cutting unit substantially supports the grass catcher. These machines include walk behind greensmowers in which the cutting unit helps support the frame or traction unit in the mowing position. Additionally, fairway mowers may have reel mower cutting units that substantially support the weight of both the lift arm and the grass catcher attached to the lift arm.

A grass catcher retaining device offered by Deere & Company on riding greensmowers includes a hook extending forwardly from the traction unit frame, which may be connected to a handle on a bail under the grass catcher. The bail is pivotably mounted to the reel mower cutting unit, allowing the grass catcher to pitch on a horizontal axis with respect to the reel. The handle slides on the hook as the grass catcher yaws or steers with the cutting unit. To install, an operator must position the grass catcher on the bail, and then fasten or latch the hook to the handle. To remove the grass catcher, the operator must reverse the two actions. An improved grass catcher retaining device is needed that can be installed or removed more easily, using only one hand.

U.S. Pat. No. 5,412,931 relates to a slidable grass catcher with a laterally extending rail on the cutting unit, and a pair of hooks on the grass catcher that engage the rail. U.S. Pat. No. 6,237,313 relates to a grass catcher support assembly that includes upper and lower support members at each side of the cutting unit that support the grass catcher, with cables attached between the upper and lower support members.

An improved grass catcher retaining device is needed that can hold the grass catcher in a position relative to the reel mower cutting unit such that the open edge of the grass catcher stays in a fixed position relative to the cutting unit while still allowing motion of the catcher and reel to accommodate varying terrain.

SUMMARY OF THE INVENTION

A grass catcher retaining device is provided for a reel mower cutting unit. The retaining device includes a central support ring pivotably attached to the top center of the grass catcher. The central support ring may include a gate that allows the ring to be latched onto a wireform loop that extends forwardly from the lift arm. The gate may be biased to a closed position. The central support ring may be pivotably mounted to the grass catcher on an axis parallel to the reel mower. Additionally, a rod may extend from each side of the grass catcher, and may engage a slot in the reel mower cutting unit.

DESCRIPTION OF THE PREFERRED EMBODIMENT

Figure 1:
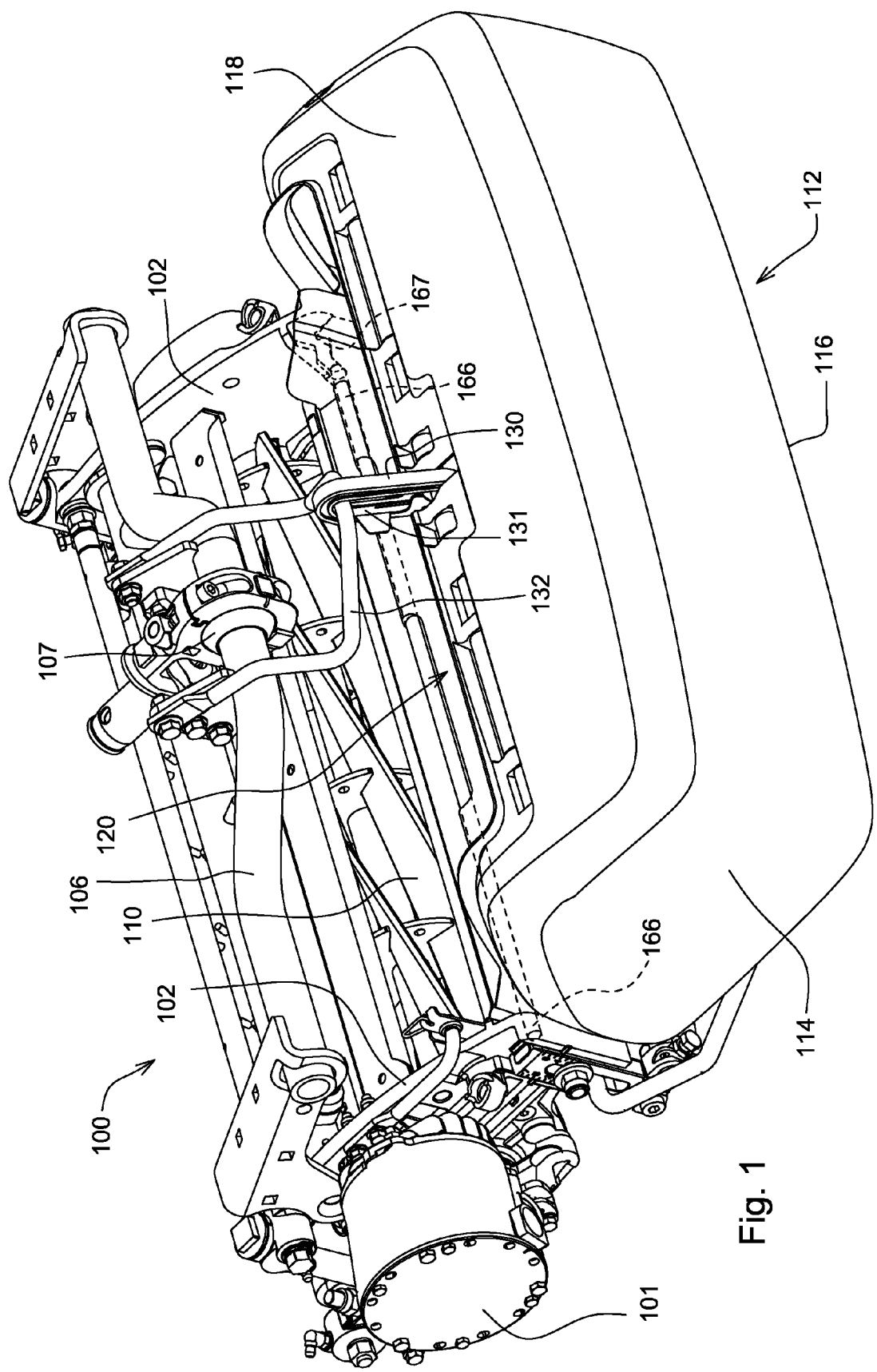
FIG. 1 is a perspective view of a reel mower cutting unit with a grass catcher retaining device according to a preferred embodiment of the invention.
Figure 2:
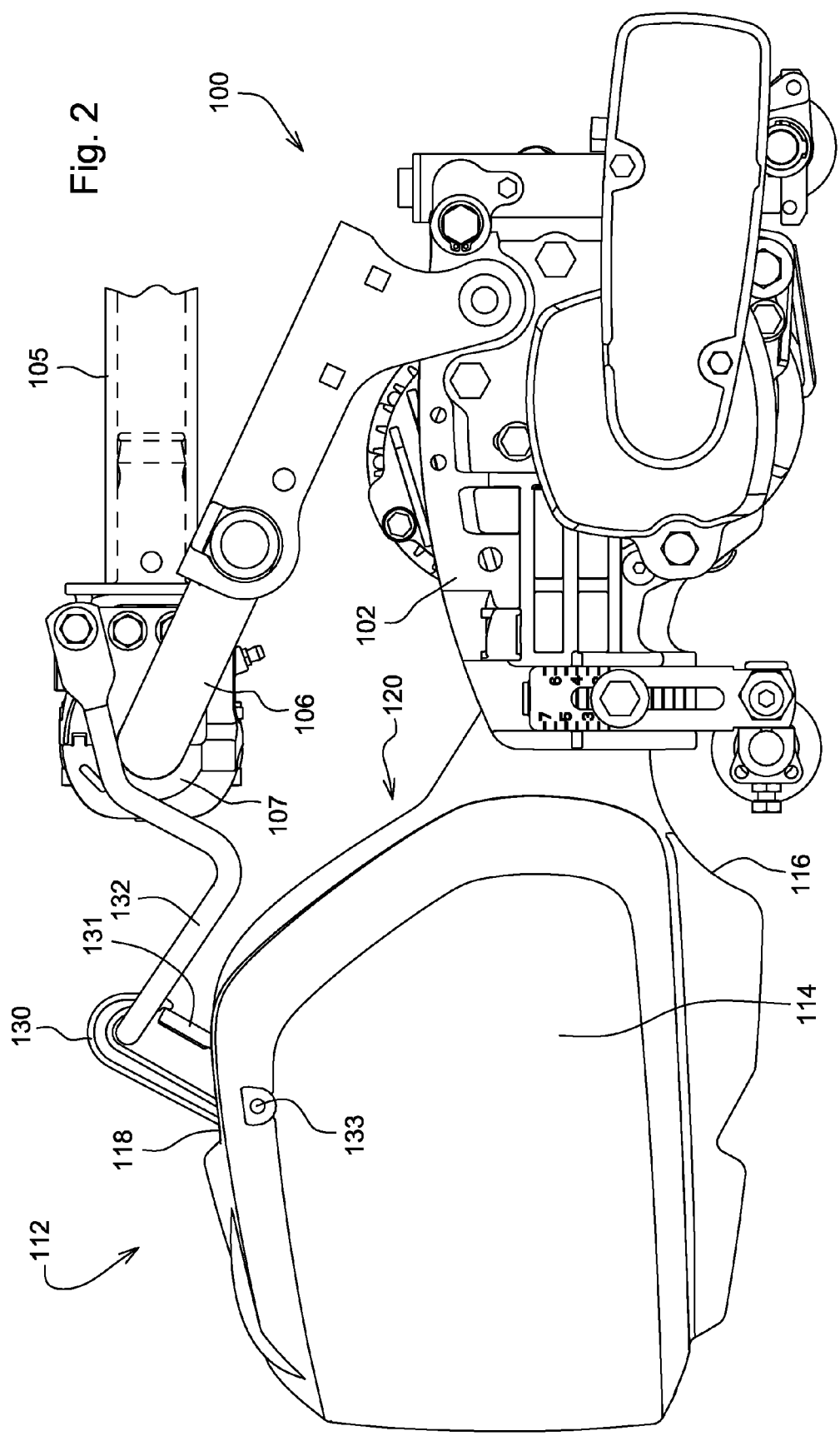
FIG. 2 is a side view of a grass catcher retaining device according to a preferred embodiment of the invention.
Figure 3:
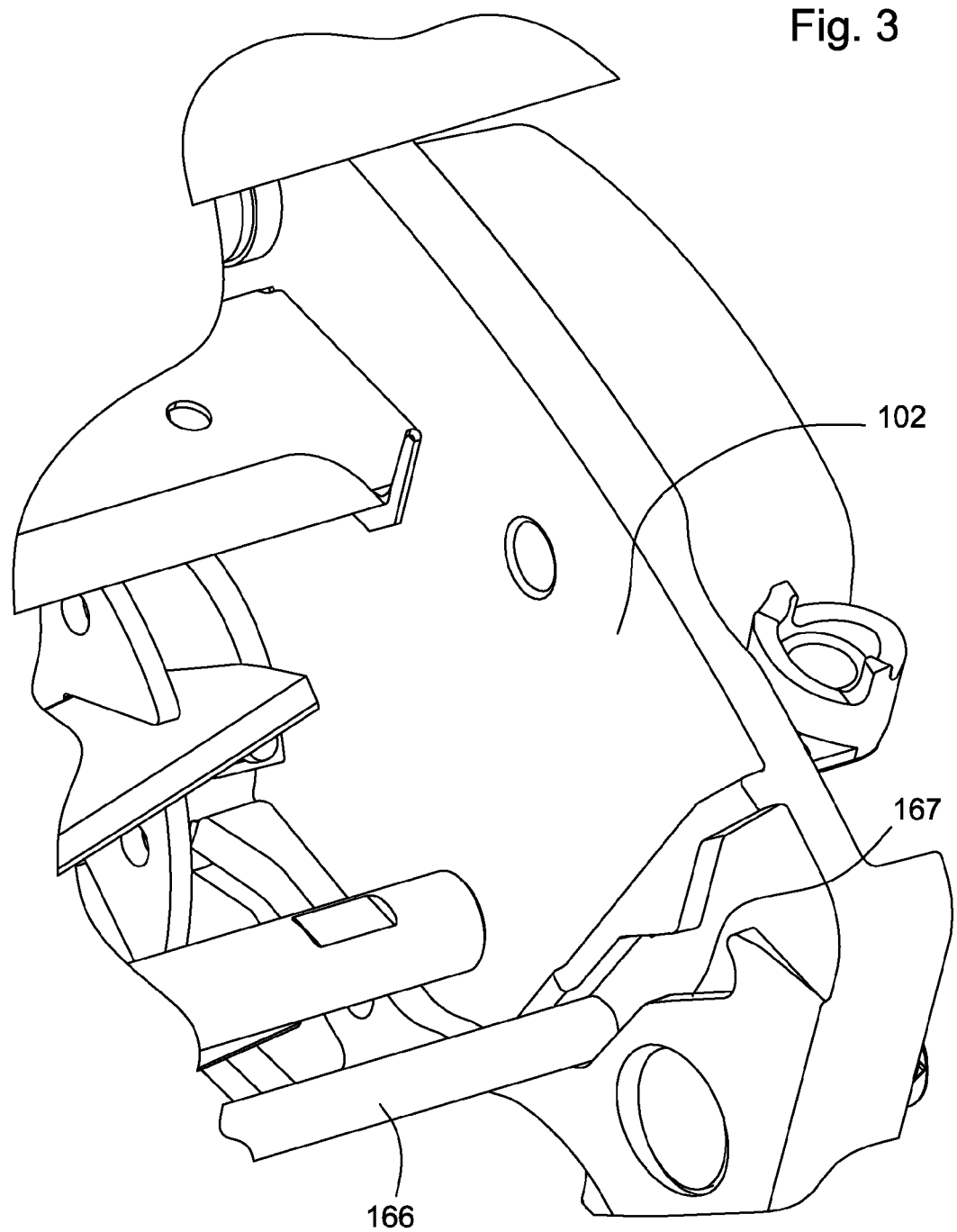
FIG. 3 is a perspective view of a rod retained in a slot in the side panel of a reel mower cutting unit according to a preferred embodiment of the invention.

In one embodiment, reel mower cutting unit 100 may be rotated by electric motor 101 mounted to one of side panels 102 on the left and right sides of the cutting unit. Alternatively, the reel mower cutting unit may be driven directly or indirectly by the engine through a mechanical or hydrostatic transmission. The blades of the reel mower cutting unit rotate about a generally horizontal and laterally extending axis. Grass may be cut between the rotating reel blades of cutting reel 110 and a bedknife mounted between the side panels. The horizontally aligned cutting reel interacts with a bedknife to cut grass with a scissoring action.

In one embodiment, the reel mower cutting unit is carried by front and rear rollers coupled to the side panels and contacting the ground during mowing operations. The front and rear rollers may be adjusted up or down to change the cutting height. While the reel mower cutting unit is on the ground in the mowing position, the cutting unit helps support the frame.

In one embodiment, reel mower cutting unit 100 may be pivotably connected to a forward extending portion of lift arm 105 that is pivotably connected to the frame of a triplex riding greensmower, fairway mower or trim mower. The lift arm may be pivotably connected to the reel mower cutting unit with yoke 106. The yoke may pull the cutting unit during mowing operations, and may have a ball joint 107 allowing the cutting unit to follow the contours of the ground surface and cut grass at a specified height. The reel mower cutting unit may pitch on a horizontal axis parallel to the reel, roll on a horizontal axis perpendicular to the direction of travel, and steer or yaw on a vertical axis.

In one embodiment, grass catcher 112 may be positioned directly in front of reel mower cutting unit 100. Grass catcher 112 may have opposing sides 114, lower wall or panel 116, and upper wall or panel 118. Opening 120 may face the reel mower cutting unit to receive grass clippings discharged by the cutting unit. The lower wall or panel of the grass catcher may extend over the front roller of the cutting unit.

In one embodiment, lift arm 105 may be hydraulically or electrically actuated to raise and lower the reel mower cutting unit between a mowing position and a transport position. The cutting unit and grass catcher may remain in a horizontal alignment as they are raised or lowered, or they may pivot to a vertical orientation during transport. Additionally, one or more cutting units may be rotated to a service position.

In one embodiment, the grass catcher may be retained on the reel mower cutting unit by center support ring 130. The center support ring may provide all or a high percentage of the support for the weight of the grass catcher and clippings. The center support ring may remain fastened between the reel mower cutting unit and grass catcher while they are raised or lowered, or at any intermediate position or alignment of the cutting unit.

In one embodiment, center support ring 130 may be an oblong metal or plastic loop with a gate 131 that is spring loaded to a closed position. The center support ring may be pivotably attached to the top center portion of the grass catcher so that the ring can pivot on a horizontal axis parallel to the cutting reel and perpendicular to the direction of travel of the grass mowing machine and cutting unit. For example, the pivot axis may be a horizontally mounted threaded fastener 133 in or adjacent the top panel 118 of the grass catcher.

In one embodiment, gate 131 may open and close so that an operator may fasten the center support ring around wireform loop 132 which extends forwardly from the yoke. The wireform loop may have a pair of ends fastened to the yoke using threaded fasteners.

In one embodiment, center support ring 130 may be a carabiner that is typically used in activities requiring ropework, such as mountain climbing or sailing, and in industrial rope access work, such as construction or window cleaning. The carabiner includes gate 131 that may snap shut under a spring's pressure, and may be nonlocking so that an operator can remove or install the carabiner on the wireform loop with one hand.

In one embodiment, the center support ring is free to rotate and slide with respect to the lift arm and wire form loop so that the grass catcher can accommodate varying terrain while maintaining a positive and secure connection between the grass catcher and the reel mower cutting unit. The center support ring allows a grass catcher to hang on the yoke of the reel mower cutting unit, and transfers a large proportion of the grass catcher's weight to the lift arm and yoke, as opposed to the cutting unit. As a result, the center support ring minimizes any influence the grass catcher may impart to the cutting unit. The center support ring also significantly reduces the complexity of the grass catcher support and allows one handed removal or installation. The center support ring provides a positive connection between the grass catcher and yoke while also providing a free range of motion.

Additionally, in one embodiment, rod 166 may extend horizontally from the sides of the grass catcher at or near lower wall or panel 116. When the grass catcher is installed on the reel mower cutting unit, each end of the rod can enter a slot 167 in the side panel of the cutting unit. The rod provides a horizontal pivot axis between the grass catcher and the reel mower cutting unit, parallel to the cutting reel, allowing the grass catcher to pitch with respect to the cutting unit. For example, the grass catcher may pitch independently of the reel mower cutting unit if undulations or obstacles are encountered by the grass catcher before the cutting unit. The rod may provide an axis and a pair of pivot points that are integral with the grass catcher.

In one embodiment, an operator may install the grass catcher by inserting each end of rod 166 into a slot 167 in the side panel of the reel mower cutting unit, and then fastening the center support ring onto the wireform. Each slot 167 may be inclined forwardly and/or tapered so that an operator can easily install and remove the grass catcher from the reel mower cutting unit. The left and right ends of the rod help maintain the grass catcher in close proximity to the reel mower cutting unit while allowing the grass catcher to pitch with respect to the cutting unit.

The grass catcher retaining device may be used on any grass mowing machine having one or more reel mower cutting units. For example, the retaining device may be used for reel mower cutting units on triplex riding greensmowers, trim mowers, or walk behind greensmowers.

Having described a preferred embodiment, it will become apparent that various modifications can be made without departing from the scope of the invention as defined in the accompanying claims.

The invention claimed is:

1. A grass catcher retaining device for a reel mower cutting unit, comprising:
   a single central support ring centrally disposed between a left side and a right side of a grass catcher, the ring being attached to a top panel of the grass catcher on an axis parallel to the reel mower cutting unit, and having a gate biased to a closed position;
   a wireform loop extending forwardly of the reel mower cutting unit above and centrally disposed between the left side and the right side of the grass catcher where the ring is attached to hang the grass catcher from the reel mower cutting unit.

2. The grass catcher retaining device of claim 1 wherein the central support ring is a carabiner.

3. The grass catcher retaining device of claim 1 wherein the central support ring is pivotably mounted to the grass catcher on an axis parallel to the reel mower.

4. The grass catcher retaining device of claim 1 further comprising a rod extending from each side of the grass catcher and engaging a slot in the reel mower cutting unit.

5. A grass catcher retaining device for a reel mower cutting unit, comprising:
   a rod extending horizontally from the sides of a grass catcher and pivotably attached to the reel mower cutting unit; and
   a single central support ring centrally disposed between a left side and a right side of the grass catcher, the ring being attached to a top panel of the grass catcher and removably fastened to a wireform loop projecting forwardly from a lift arm for the reel mower cutting unit above and centrally disposed between the left side and the right side of the grass catcher where the ring is attached to suspend the grass catcher from the reel mower cutting unit.

6. The grass catcher retaining device of claim 5 wherein the central support ring has a gate biased to the closed position.

7. The grass catcher retaining device of claim 5 wherein the central support ring is pivotable on an axis parallel to the cutting reel.

8. The grass catcher retaining device of claim 5 wherein the rod is insertable into a slot in a side panel of the reel mower cutting unit.

9. A grass catcher retaining device for a reel mower cutting unit, comprising:

a single central support ring pivotably mounted to a top panel of a grass catcher and to a support member projecting forwardly from the reel mower cutting unit above and centrally disposed between the left side and the right side of the grass catcher such that the central support ring can pivot on a horizontal axis parallel to the reel mower cutting unit and having a gate spring loaded to a closed position.

10. The grass catcher retaining device of claim 9 further comprising a rod extending horizontally from the grass catcher and engageable with the reel mower cutting unit.

11. The grass catcher retaining device of claim 10 further comprising a pair of slots in the reel mower cutting unit where the rod is engageable.

12. The grass catcher retaining device of claim 10 wherein the support member is a wireform loop onto which the central support ring may be latched.

* * * * *